United States Patent
Liang

(10) Patent No.: US 7,168,772 B1
(45) Date of Patent: Jan. 30, 2007

(54) ENGAGING DEVICE OF A HANDLE FOR A MODULARIZED CASING

(75) Inventor: Chien-Fa Liang, Chung-Ho (TW)

(73) Assignee: Super Micro Computer, Inc., San Jose, CA (US)

( * ) Notice: Subject to any disclaimer, the term of this patent is extended or adjusted under 35 U.S.C. 154(b) by 0 days.

(21) Appl. No.: 11/358,108

(22) Filed: Feb. 22, 2006

(51) Int. Cl.
*A47B 8/00* (2006.01)
*E05B 63/20* (2006.01)

(52) U.S. Cl. .............................. 312/223.1; 312/223.2; 292/336.3; 361/747

(58) Field of Classification Search ............. 292/336.3, 292/207; 312/223.2, 223.1; 361/726, 732, 361/747, 759; 70/58
See application file for complete search history.

(56) References Cited

U.S. PATENT DOCUMENTS

| | | | |
|---|---|---|---|
| 3,999,110 A * | 12/1976 | Ramstrom et al. .......... 320/112 |
| 5,206,098 A * | 4/1993 | Cho et al. ..................... 429/96 |
| 5,208,735 A * | 5/1993 | Twachtmann et al. ...... 361/725 |
| 6,317,329 B1 * | 11/2001 | Dowdy et al. .............. 361/725 |
| 6,704,195 B1 * | 3/2004 | Cravens et al. ............. 361/687 |
| 6,937,481 B1 * | 8/2005 | Newman et al. ............ 361/801 |

* cited by examiner

*Primary Examiner*—Gary Estremsky
*Assistant Examiner*—Mark Williams
(74) *Attorney, Agent, or Firm*—Lowe Hauptman & Berner, LLP

(57) ABSTRACT

An engaging device of a handle for a modularized casing is composed of a modularized casing; a handle; an outer sleeve; a side of casing being provided with a positioning hole for emplacing the hook; a shaft pin which is loosely connected to the pivoting holes of casing and handle, with the handle being rotated against the shaft pin. The handle can be firmly locked to the modularized casing without being loosened and dislocated, and the engaging device can be rapidly released from the positioning hole, while most of a volume of the handle will not protrude out of the modularized casing.

3 Claims, 5 Drawing Sheets

ENGAGING DEVICE OF A HANDLE FOR A MODULARIZED CASING

BACKGROUND OF THE INVENTION a) Field of the Invention

The present invention relates to an engaging device of a handle for a modularized casing, and more particularly to an engaging device which is installed at a front end of a handle, which can be rapidly engaged into/released from a positioning hole of a modularized casing, and which enables most of a volume of the handle to be abutted on a surface of the modularized casing, such that the handle can be firmly locked to the modularized casing without being loosened and dislocated, and the engaging device can be rapidly removed from the positioning hole without exposing most of the volume of handle out of the modularized casing.

b) Description of the Prior Art

It is well known that a casing of an industrial computer or an ordinary computer is provided with all kinds of expansion slots of various sizes for providing an insertion of all kinds of rectangular modularized casings of various sizes. A variety of handles is installed at an exterior of the modularized casing, which is provided with the following drawbacks under a long term of usage: the handle is not provided with an effective engaging structure to be locked to the modularized casing, and the handle is protruded out of the modularized casing, such that a clothes or body of an operator is very easy to get in touch with the handle, which will enable the handle to be abnormally subjected to an external force, thereby enabling the modularized casing to be subjected to an force and thus to be dislocated.

SUMMARY OF THE INVENTION

The primary object of present invention is to provide an engaging device of a handle for a modularized casing, which is installed on a handle and can be rapidly locked into a positioning hole preset on a front wall of modularized casing, such that the handle can be firmly positioned on the modularized casing, without being subjected to an inadvertent force to be loosened.

Another object of the present invention is to provide an engaging device of a handle for a modularized casing, which is installed on a handle and can be rapidly released from a positioning hole preset on a front wall of modularized casing, such that the handle can be held by a hand to be shifted.

Yet another object of the present invention is to provide an engaging device of a handle for a modularized casing, whereby most of a volume of handle can be attached on a surface of modularized casing, such that most of the volume of handle will not protrude out of the modularized casing to prevent from being subjected to an inadvertent force.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
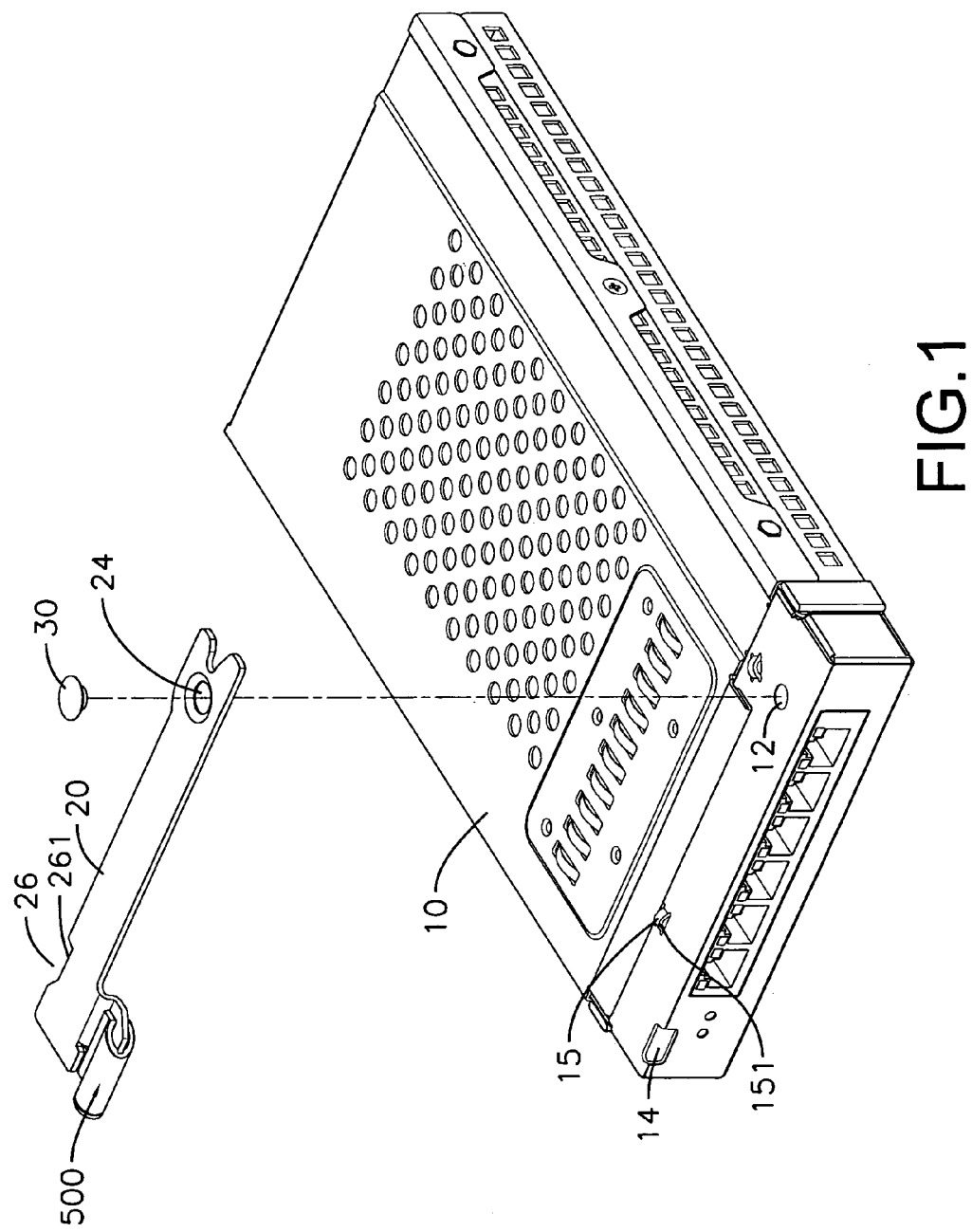
FIG. 1 shows an exploded view of a handle and a casing of the present invention.
Figure 2:
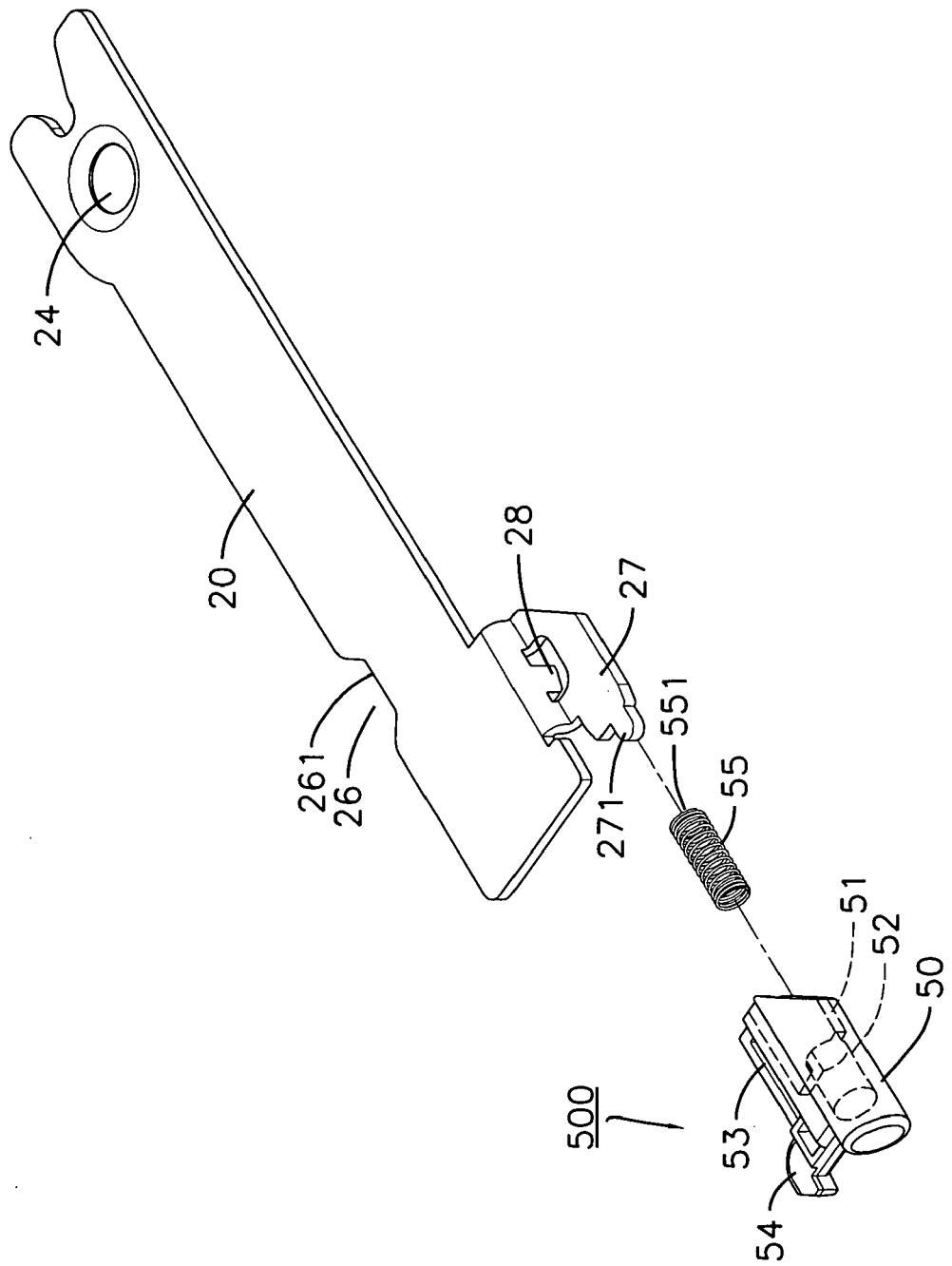
FIG. 2 shows an exploded view of a handle of the present invention.
Figure 5:
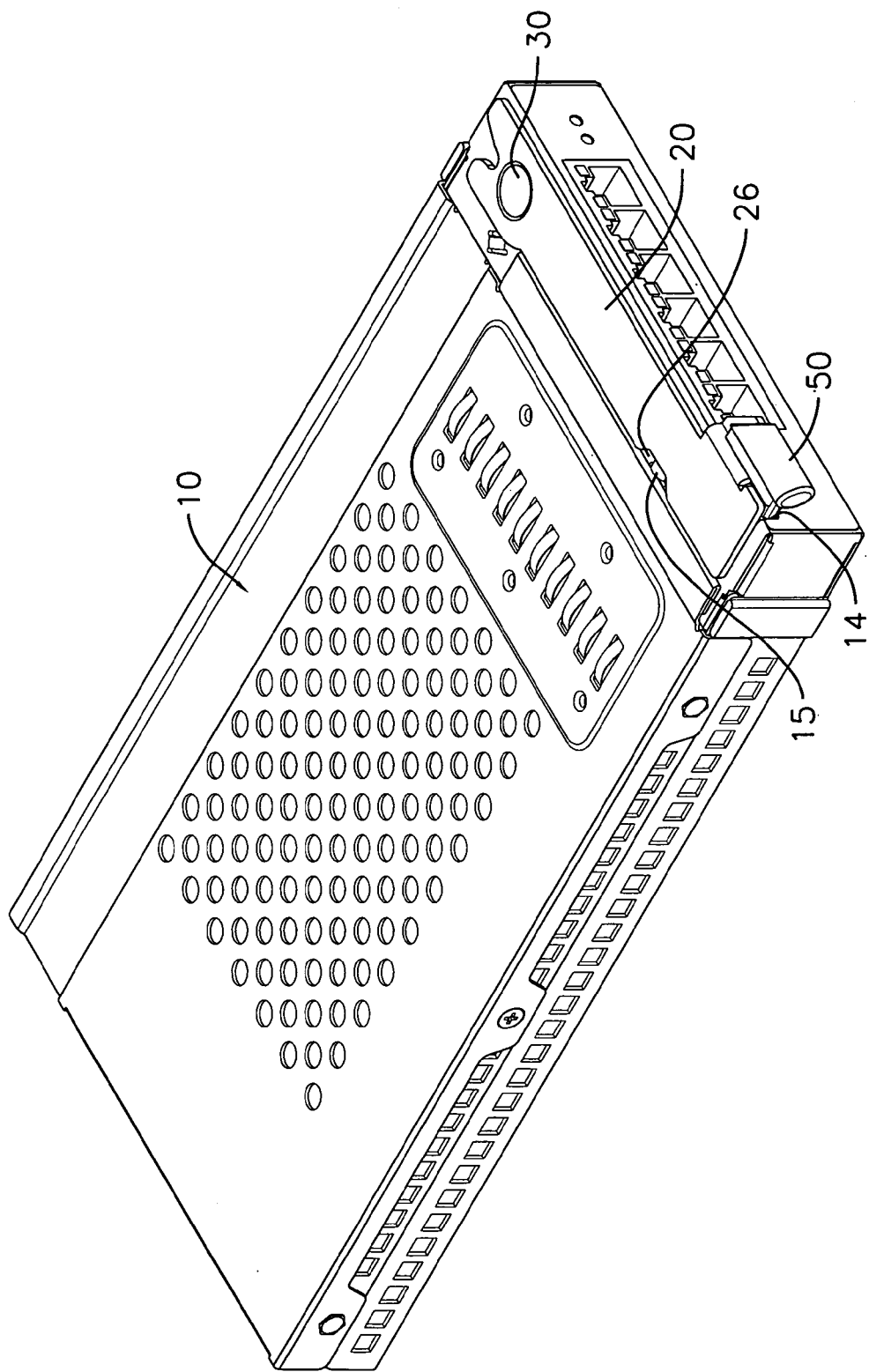
FIG. 5 shows a perspective view of an assembly of handle and casing of the present invention.

Referring to FIG. 1, FIG. 2, and FIG. 5, the present invention is to provide an engaging device of a handle for a modularized casing which includes a rectangular modularized casing 10, a surface of which is provided with a pivoting hole 12; a handle 20, a rear end of which is formed with a pivoting hole 24, and a side of an outer end of which is provided with a projection piece 27 in an extended shape, with a projection body 271 of a smaller outer diameter being formed at an outer end of the projection piece 27 and a longitudinal projection part 28 being formed at an inner side of the projection piece 27; an engaging device 500 comprising an outer sleeve 50, an interior of which is provided with a transversal and plate-shape groove 51 and a cylindrical groove 52, both of which are interconnected, and a side edge of which is extended into a hollow through-slot 53 and a hook 54 with the through-slot 53 providing for a transfixing of the projection part 28; a spring 55 which is inserted into the cylindrical groove 52 and a connection end 551 of which is sheathed into the projection body 271 with the projection piece 27 being transfixed into the plate-shape groove 51.

Figure 3:
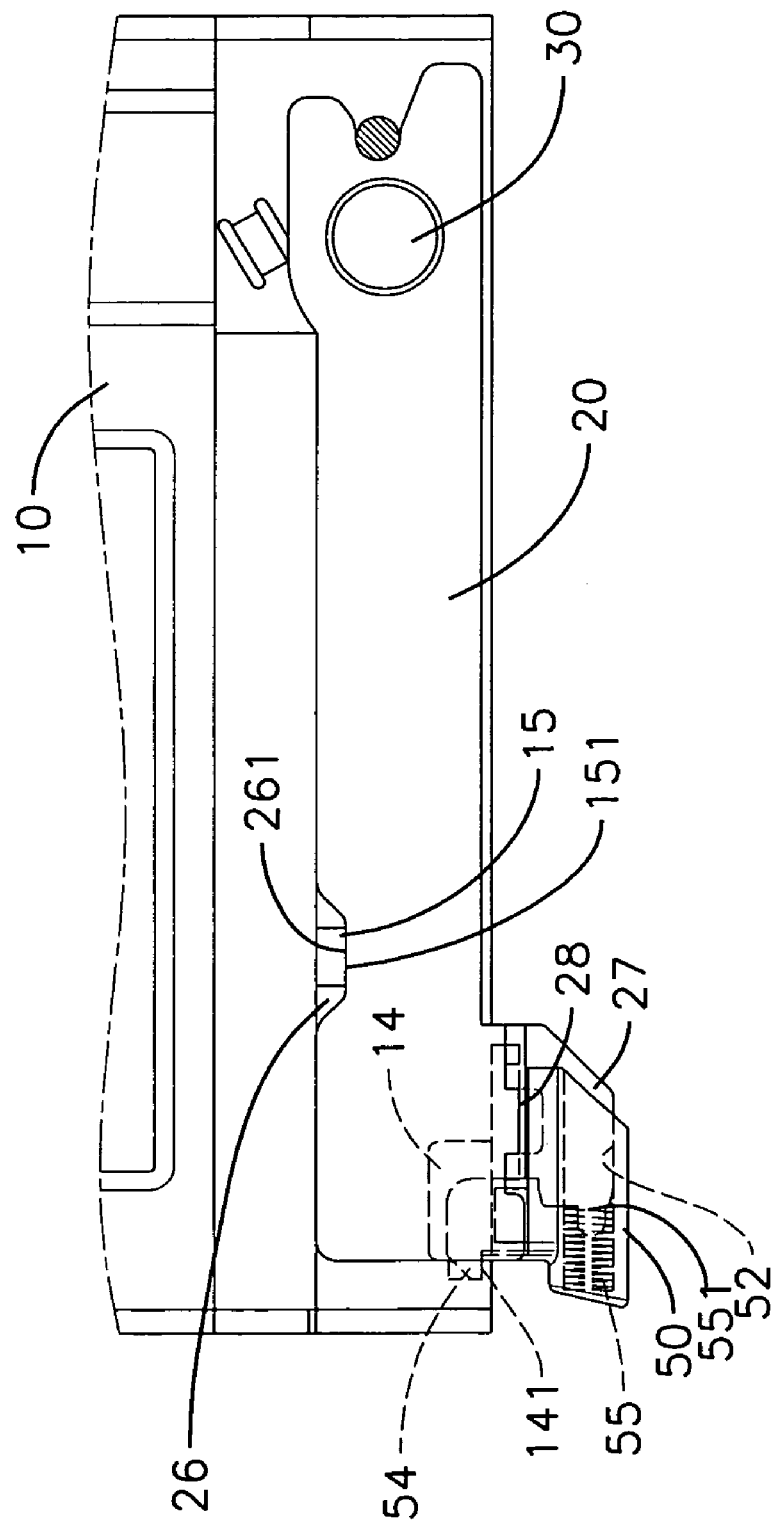
FIG. 3 shows a horizontal view of motion of assembling a handle into a casing of the present invention.

A positioning hole 14 is located at an edge of side end of the casing 10 (as shown in FIG. 1), and the hook 54 can be emplaced in the positioning hole 14 and can be locked to an inner wall 141 of the positioning hole 14 (as shown in FIG. 3).

A shaft pin 30 is loosely connected to the pivoting hole 12 of casing 10 and the pivoting hole 24 of handle 20, whereas the handle 20 is rotating against the shaft pin 30.

Figure 4:
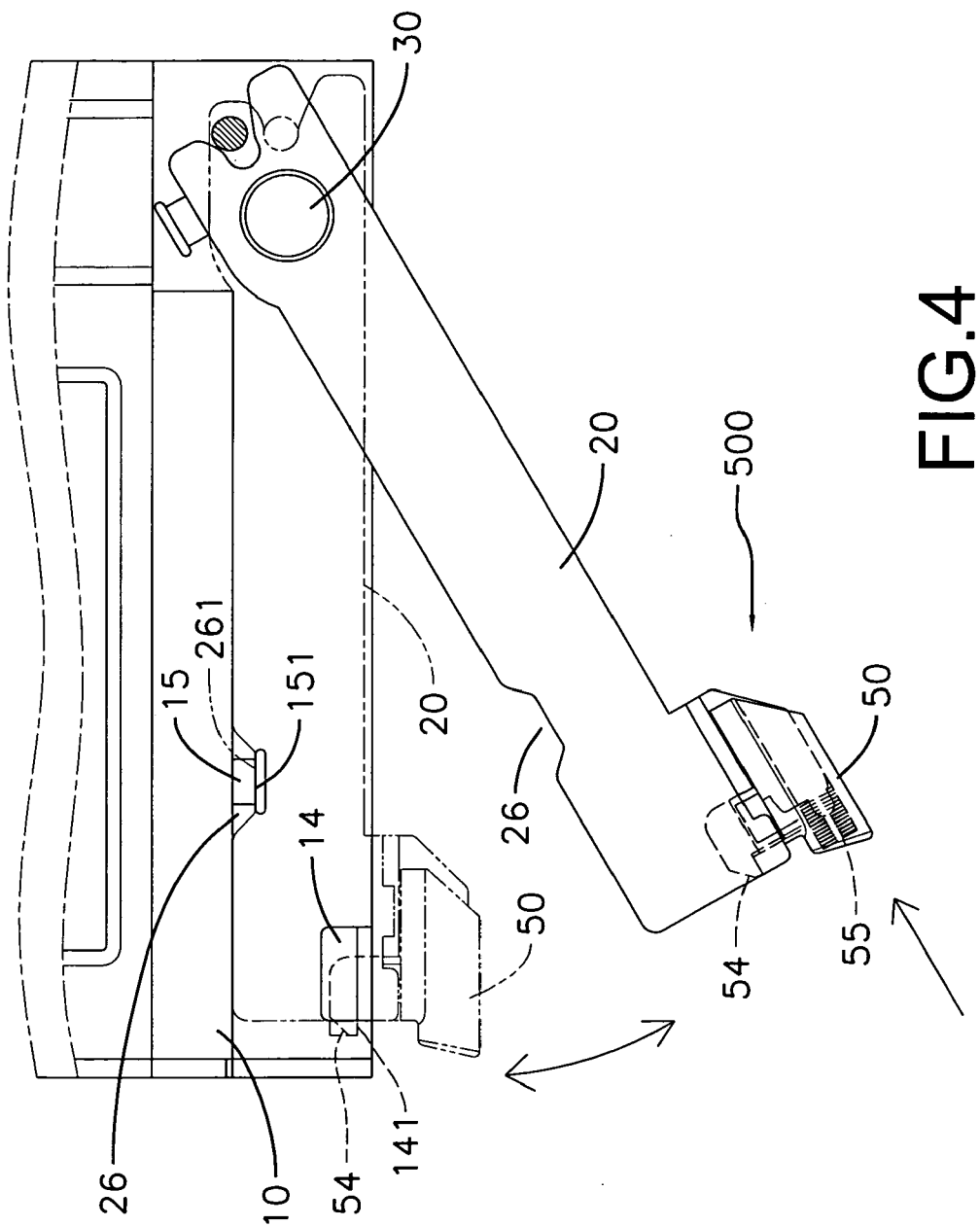
FIG. 4 shows a horizontal view of motion of pulling out a handle from a casing of the present invention.

Referring to FIG. 3 and FIG. 4, a projection body 15 is located on a surface of casing 10 and on a side surface close to a front end of handle 20, a notch 26 is located at a side wall of handle 20, and an inner wall 261 of the notch 26 can be abutted on a side edge 151 of the projection body 15.

Referring to FIG. 2 and FIG. 3, the longitudinal projection part 28 can be relatively shifted in the through-slot 53, the projection piece 27 can be relatively shifted in the plate-shape groove 51, and the projection body 27 can be relatively shifted in the cylindrical groove 52.

Referring to FIG. 2 and FIG. 4, when an outer sleeve 50 is grabbed by fingers of an operator and compressed, the outer sleeve 50 will be shifted linearly toward a direction of inner side of a handle 20, that is, the outer sleeve 50 will be shifted on a projection piece 27, a spring 55 will be in a contraction status in a cylindrical groove 52, and a hook 54 will be shifted simultaneously with the outer sleeve 50 to leave an inner wall 141 for being located at a position of positioning hole 14. Next, the outer sleeve 50 will be pulled by the fingers, such that the handle 20 will be rotated by an angle with a shaft pin 30 as a center of axis, and the hook 54 will leave the positioning hole 14, therefore the entire handle 30 will become a rocker arm and protrude out of a casing 10 at a certain angle. Accordingly, as long as the outer sleeve 50 is pressed by the fingers and the handle 20 is pulled outward, the hook 54 in an engaging device 500 will be quickly released from the positioning hole 14.

Referring to FIG. 3 and FIG. 5, when a force exerted to the outer sleeve 50 by the fingers is released, the spring 55 will be elastically restored and a connection end 551 will be abutted on a projection piece 27, such that the outer sleeve 50 can be elastically shifted outward in the projection piece 27, and a projection part 28 can be relatively shifted in a through-slot 53 of a pre-determined length (in fact, the projection part 28 is stationary). The design purpose of projection part 28 is to prevent the outer sleeve 50 from being sliding out of the projection piece 27 during shifting. As the projection piece 27 and a plate-shape groove 61 are relatively shifted (in fact, the projection piece is stationary), the hook 54 will be simultaneously shifted along with the outer sleeve 50, which will in turn enable the hook 54 to be shifted into the positioning hole 14 and locked on an inner wall 141. Accordingly, if the outer sleeve 50 is pressed correctly by the fingers, the engaging device 500 will not be released from the positioning hole freely, so as to prevent the handle 20 from being shifted when being subjected to an inadvertent force. In addition, as a projection body 15 is located in a notch 26, a side edge 151 can be abutted on an inner wall 261. On the other hand, as most of a volume of the handle 20 is on a surface of casing 10, it is provided with a hidden effect to keep an appearance of casing 10 to be neat and beautiful.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An engaging device of a handle in combination with a modularized casing comprising a rectangular modularized casing, a surface of which is provided with a pivoting hole; a handle, a rear end of which is formed with a pivoting hole, and a side of an outer end of which is provided with a projection piece in an extended shape, with a projection body of a smaller outer diameter being formed at an outer end of the projection piece and a longitudinal projection part being formed at an inner side of the projection piece; an engaging device including an outer sleeve, an interior of which is provided with a transversal and plate-shape groove and a cylindrical groove, both of which are interconnected, and a side edge of which is extended into a hollow through-slot and a hook with the through-slot providing for a transfixing of the projection part; and a spring, which is inserted into the cylindrical groove and a connection end of which is sheathed into the projection body with the projection piece being transfixed into the plate-shape groove; a positioning hole which is located at an edge of a side end of casing; said hook which can be emplaced in the positioning hole and can be locked to an inner wall of positioning hole; a shaft pin which is loosely connected to the pivoting hole of casing and the pivoting hole of handle with the handle being rotated against the shaft pin.

2. The engaging device of a handle in combination with a modularized casing according to claim 1, wherein a projection body is located on a surface of casing and on a side surface close to a front end of handle, and a notch is located on a side wall of handle, with an inner wall of notch being able to be abutted on a side wall of the projection body.

3. The engaging device of a handle in combination with a modularized casing according to claim 1, wherein the projection part can be relatively shifted in the through-slot, the projection piece can be relatively shifted in the plate-shape groove, and the projection body can be relatively shifted in the cylindrical groove.

* * * * *